J. M. BURTON.
WATER METER.
APPLICATION FILED MAY 10, 1913.
1,091,481. Patented Mar. 31, 1914.
2 SHEETS—SHEET 2.
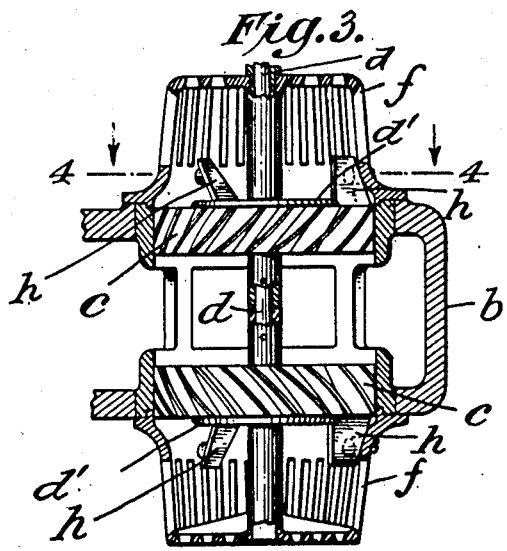
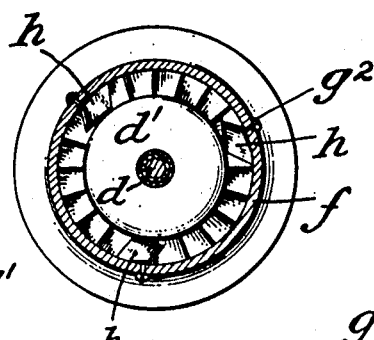
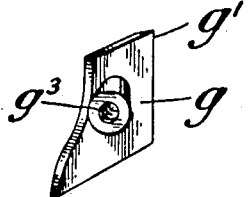
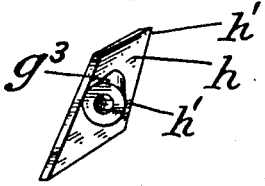
Attest:
Inventor:
James M. Burton
by Redding Greeley & Goodlett
Attys.

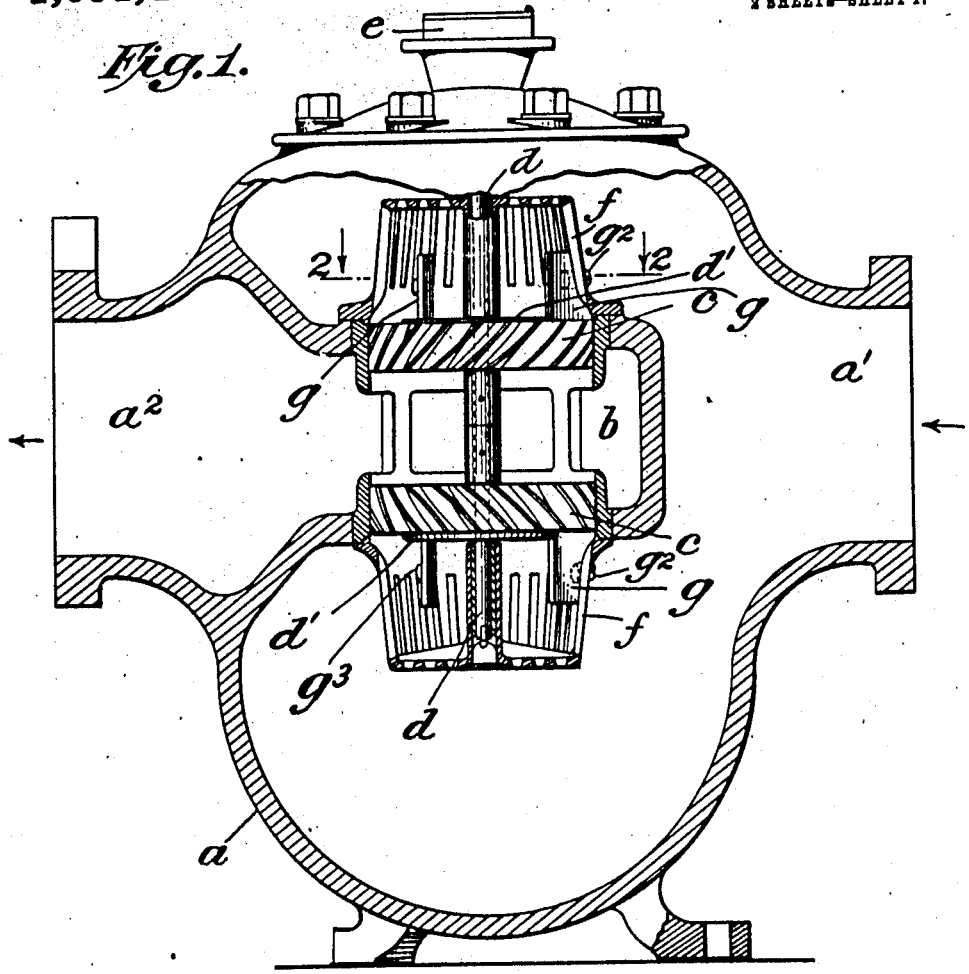
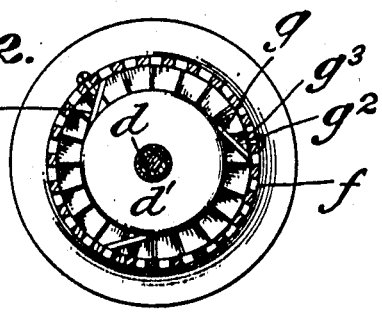

UNITED STATES PATENT OFFICE.

JAMES M. BURTON, OF NEW YORK, N. Y., ASSIGNOR TO NEPTUNE METER COMPANY, OF NEW YORK, N. Y., A CORPORATION OF NEW JERSEY.

WATER-METER.

1,091,481.  Specification of Letters Patent.  Patented Mar. 31, 1914.

Application filed May 10, 1913. Serial No. 766,722.

*To all whom it may concern:*

Be it known that I, JAMES M. BURTON, a citizen of the United States, residing in Long Island City, in the borough of Queens of the city of New York, in the State of New York, have invented certain new and useful Improvements in Water-Meters, of which the following is a specification, reference being had to the accompanying drawings, forming a part hereof.

This invention relates to devices for preventing the operation of water meters from being interfered with by foreign substances, such as algæ, chips, leaves, etc., and especially to devices for this purpose which are adapted for use with inferential meters which employ turbine wheels. In meters of this character algæ, chips, dead leaves, etc., are apt to lodge on the edges of the blades of the turbine wheel or wheels and so reduce the mean area of the passage between the blades and cause the wheels to rotate at a higher rate of speed and the meter to register correspondingly higher.

It is an object of this invention to provide means disposed operatively with relation to the inflowing water and the turbine wheel or wheels so that the foreign substances above referred to will be constantly scraped from the edges of the turbine wheels and disintegrated so as to permit their free passage between the blades of the wheels.

In accordance with the invention a scraper of suitable form is secured within the meter casing adjacent to the edge or end of the wheel or wheels so as to dislodge foreign substances which tend to accumulate on the edges of the blades. The scraper is preferably so positioned that it not only dislodges the foreign substances from the edges of the blades but also cuts such substances as algæ, which drape themselves over the edges of the blades, and disintegrates the same so as to permit their free passage through the turbine wheel. The scrapers are preferably formed of such an outline and are so mounted within the meter casing as to constitute deflectors, so that they shall constantly deflect the foreign substances from the proximity of the inner wall of the meter chamber, where they naturally travel under the influence of centrifugal force, toward the center of the turbine wheel and over the stop plate. By this arrangement the foreign substances are brought into contact with the scrapers several times and until they are disintegrated sufficiently to pass through the turbine wheel.

Reference is now to be had to the accompanying drawings for a detailed description of the invention, in which—

Figure 1 is a view in vertical section of a water meter of the turbine wheel type provided with the present invention, the casing of the registering device being shown in elevation. Fig. 2 is a detail view in section through the cages on the plane indicated by the line 2—2 of Fig. 1, the scrapers being shown in plan. Fig. 3 is a fragmentary view in vertical section of the intermediate chamber of a meter of the type shown in Fig. 1 and provided with a modified form of the invention. Fig. 4 is a sectional view taken on the plane indicated by the line 4—4 of Fig. 3. Fig. 5 is an enlarged view in perspective of the scraper shown in Fig. 1. Fig. 6 is a view similar to Fig. 5 and showing the scraper illustrated in Fig. 3.

The outer wall $a$ constituting the casing of the meter illustrated in Fig. 1 is extended inwardly so as to divide the interior of the meter and to form a central intermediate chamber $b$. In the walls of the chamber $b$ may be mounted the rotating turbine wheels $c$, both of which are secured to a common shaft $d$ operatively connected to the registering devices indicated generally at $e$. The turbine wheels $c$ are protected from injury from relatively large and hard foreign substances flowing into the meter through the inlet $a'$ by slotted cages $f$ secured to the walls of the central chamber $b$. In the arrangement shown in Fig. 1, the lowermost of these cages $f$ may constitute an end bearing for the actuating shaft $d$, while the uppermost cage $f$ may have formed therein a suitable bearing to hold the actuating shaft in proper axial position. As is usual in meters of this type the central portions of the turbine wheels c are closed against the passage of water therethrough by stop plates d' which may be secured to the actuating shaft d so as to rotate therewith.

The construction thus far described is common to meters of this general type and it is to be understood that the invention to be hereinafter set forth is not limited in its application to a water meter embodying the elements thus far set forth and arranged in the manner illustrated in the drawings. It is believed, however, that the foregoing description will conduce to a clearer understanding of the application of the scraper.

The construction of the scraper g shown in Fig. 1 is illustrated in detail in Fig. 5. As shown in the last named figure, the scraper g has a relatively sharp edge g' which stands substantially parallel with the actuating shaft d so that the foreign substances thrown outwardly from the shaft under centrifugal force toward the turbine blades encounter this sharp edge and are cut and disintegrated thereby. The scraper itself may be secured to the inner side of the cage f by means of a suitably threaded stud $g^2$ which may pass through the cage and engage firmly a correspondingly threaded lug $g^3$ cast on one face of the scraper. By this construction the head of the threaded stud $g^2$ is always accessible so that the scraper may be removed or secured in position readily. The lug $g^3$ on the scraper g is preferably disposed angularly with respect thereto so that when the scraper is secured in position it shall be substantially tangential to the stop plate d' and serve as a deflector, as appears most clearly in Fig. 2. It will be evident that by this arrangement the foreign substances, which are thrown outwardly from the actuating shaft d under centrifugal action finally encounter the scraper g and by reason of its angularity with respect to the path on which the substances tend to travel they are deflected inwardly toward the actuating shaft only to repeat their outward travel until broken up sufficiently to pass between the blades of the turbine wheels c. The lower edge of the scraper g is placed in juxtaposition to the upper edges of the blades of the turbine wheels c so that the scraper dislodges the algæ and other foreign substances which tend to drape themselves over the edges of the blades. The bodily dislodging of these foreign substances from the upper edges of the blades is accompanied by a cutting action as well, so that the constituent parts of the substances are permitted immediately to pass between the blades of the wheels and be carried onward by the flow of water through the outlet $a^2$.

The scraper h illustrated in Figs. 3-6 is mounted within the cages f of the central chamber b in substantially the same position as pointed out hereinbefore with respect to the scraper g. However, it will appear from a glance at Fig. 6 that the scraper h is substantially diamond shaped and is disposed so as to present an inclined cutting edge h' to the foreign substances as well as a very sharp cutting point, which has proven to be very effective in disintegrating such substances. Furthermore, as appears from Fig. 4, the deflecting face of the scraper h is not only substantially tangential to the stop plate d' but inclined generally upwardly and outwardly therefrom so as to give the outwardly traveling substances a combined inward and upward movement. In this manner the return of these foreign substances to the inflowing stream of water is doubly assured so that their subsequent outward travel to succeeding disintegrating engagements with the scraper is assured.

Other modifications in the general form of the scraper employed will suggest themselves to those skilled in the art but all such changes in form are to be deemed within the spirit of this invention provided that they fall within the scope of the claims hereto annexed.

I claim as my invention:

1. In combination with a meter casing having an inlet and an outlet and an apertured inner wall, a turbine wheel mounted in said wall and actuated by the flow of liquid therethrough, a stop plate mounted with the wheel, a slotted cage secured to said inner wall and inclosing the wheel, and a scraper removably secured to the inner wall of the cage with its lower edge in juxtaposition to the edges of the blades of the turbine wheel, the body of the scraper being disposed substantially tangential to the stop plate.

2. In combination with a meter casing having an inlet and an outlet and an apertured inner wall, a turbine mounted in said wall and actuated by the flow of liquid therethrough, a slotted cage secured to said inner wall and inclosing the wheel, and a scraper secured to the inner wall of the cage with its lower edge in juxtaposition to the edges of the blades of the turbine wheel, the body of the scraper being disposed angularly to the upper edges of the blades and its deflecting face being inclined upwardly and outwardly therefrom.

3. In combination with a meter casing having an inlet and an outlet and an apertured inner wall, a turbine mounted in said wall and actuated by the flow of liquid therethrough, a stop plate mounted with the wheel, a slotted cage secured to said inner wall and inclosing the wheel, and a substantially diamond-shaped scraper secured to the inner wall of the cage with its lower edge in juxtaposition to the edges of the blades of the turbine wheel and its upper and forward edges meeting in a cutting point in the path of the material to be disintegrated, the body of the scraper being disposed substantially tangential to the stop plate.

This specification signed and witnessed this 6th day of May, A. D. 1913.

JAMES M. BURTON.

Signed in the presence of—
W. B. GREELEY,
WORTHINGTON CAMPBELL.

Copies of this patent may be obtained for five cents each, by addressing the "Commissioner of Patents, Washington, D. C."